US008695081B2

(12) United States Patent
Bansal et al.

(10) Patent No.: US 8,695,081 B2
(45) Date of Patent: Apr. 8, 2014

(54) METHOD TO APPLY NETWORK ENCRYPTION TO FIREWALL DECISIONS

(75) Inventors: Ravi Prakash Bansal, Tampa, FL (US); Rick Allen Hamilton, II, Charlottesville, VA (US); Brian Marshall O'Connell, Cary, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1451 days.

(21) Appl. No.: 11/733,395

(22) Filed: Apr. 10, 2007

(65) Prior Publication Data

US 2008/0256618 A1    Oct. 16, 2008

(51) Int. Cl.
G06F 15/16   (2006.01)
G06F 17/00   (2006.01)
H04L 29/06   (2006.01)

(52) U.S. Cl.
CPC .............. *H04L 63/08* (2013.01); *H04L 63/205* (2013.01)
USPC ................... 726/11; 726/12; 726/13; 726/14; 726/15; 726/23

(58) Field of Classification Search
CPC .............................. H04L 63/08; H04L 63/205
USPC ......... 726/4, 1, 11–15, 23; 709/223–226, 232
See application file for complete search history.

(56) References Cited

U.S. PATENT DOCUMENTS

| | | | |
|---|---|---|---|
| 5,968,176 A | 10/1999 | Nessett | |
| 6,075,860 A | 6/2000 | Ketcham | |
| 6,289,384 B1 | 9/2001 | Whipple | |
| 6,594,246 B1 | 7/2003 | Jorgensen | |
| 6,609,154 B1 | 8/2003 | Fuh et al. | |
| 6,640,248 B1 | 10/2003 | Jorgensen | |
| 6,804,783 B1 | 10/2004 | Wesinger, Jr. et al. | |
| 6,857,009 B1 | 2/2005 | Ferreria et al. | |
| 6,880,089 B1 | 4/2005 | Bommareddy et al. | |
| 6,928,476 B2 * | 8/2005 | Bucher | 709/225 |
| 6,993,323 B2 | 1/2006 | Kamma | |
| 7,055,173 B1 | 5/2006 | Chaganty et al. | |
| 7,076,239 B2 | 7/2006 | Kirkup et al. | |

(Continued)

OTHER PUBLICATIONS

Tyson, Jeff, "How Stuff Works, How Firewalls Work" downloaded on Feb. 5, 2007 from http://computer.howstuffworks.com/firewall.htm/printable.

(Continued)

*Primary Examiner* — Catherine Thiaw
(74) *Attorney, Agent, or Firm* — Robert H. Frantz; David A. Mims; Arthur J. Samadovitz

(57) ABSTRACT

A system and related methods for providing a handler for requests to access a wireless network, operable by or separate from an enhanced personal firewall system, which obtains connection-related information from the operating system, network interface drivers, or both, and then provides that information to a controller which determines to allow or deny access. By collecting certain connection-related information, new levels and granularities of control are allowed and enabled. The process is equally well suited for implementation by a wireless device which may be in range of multiple servers or networks, such that the device may allow different levels of access to the device by the different servers or networks according to the collected connection-related information.

7 Claims, 15 Drawing Sheets

(56) References Cited

U.S. PATENT DOCUMENTS

| | | | |
|---|---|---|---|
| 7,076,653 B1* | 7/2006 | Remer et al. | 713/155 |
| 7,085,808 B2* | 8/2006 | Haverinen et al. | 709/203 |
| 7,088,727 B1 | 8/2006 | Short et al. | |
| 7,136,645 B2 | 11/2006 | Hanson et al. | |
| 7,353,533 B2* | 4/2008 | Wright et al. | 726/1 |
| 7,360,242 B2 | 4/2008 | Syvanne | |
| 7,478,424 B2* | 1/2009 | Mester et al. | 726/11 |
| 7,490,350 B1* | 2/2009 | Murotake et al. | 726/11 |
| 7,516,485 B1* | 4/2009 | Lee et al. | 726/11 |
| 7,633,909 B1* | 12/2009 | Jones et al. | 370/338 |
| 7,752,463 B2* | 7/2010 | Hahn et al. | 713/193 |
| 7,895,449 B2* | 2/2011 | Benedikt | 713/191 |
| 8,051,474 B1* | 11/2011 | Bedin et al. | 726/12 |
| 8,117,639 B2* | 2/2012 | MacKinnon et al. | 726/1 |
| 8,316,427 B2* | 11/2012 | Bansal et al. | 726/11 |
| 2002/0099808 A1 | 7/2002 | Pisupati et al. | |
| 2002/0143866 A1 | 10/2002 | Lewis et al. | |
| 2003/0055962 A1 | 3/2003 | Freund et al. | |
| 2003/0061405 A1 | 3/2003 | Fisher et al. | |
| 2003/0097590 A1 | 5/2003 | Syvanne | |
| 2003/0167405 A1 | 9/2003 | Freund et al. | |
| 2003/0167410 A1* | 9/2003 | Rigstad et al. | 713/201 |
| 2003/0236990 A1 | 12/2003 | Hrastar et al. | |
| 2004/0003285 A1* | 1/2004 | Whelan et al. | 713/201 |
| 2004/0097217 A1 | 5/2004 | McClain | |
| 2004/0107219 A1* | 6/2004 | Rosenberger | 707/104.1 |
| 2004/0109567 A1* | 6/2004 | Yang et al. | 380/277 |
| 2004/0215957 A1 | 10/2004 | Moineau et al. | |
| 2005/0055578 A1 | 3/2005 | Wright et al. | |
| 2005/0198261 A1* | 9/2005 | Durvasula et al. | 709/224 |
| 2005/0240779 A1 | 10/2005 | Aull et al. | |
| 2006/0075478 A1* | 4/2006 | Hyndman et al. | 726/11 |
| 2006/0080432 A1 | 4/2006 | Spataro et al. | |
| 2006/0126848 A1* | 6/2006 | Park et al. | 380/277 |
| 2006/0193284 A1* | 8/2006 | Stieglitz et al. | 370/328 |
| 2006/0200862 A1* | 9/2006 | Olson et al. | 726/23 |
| 2006/0209700 A1* | 9/2006 | Sundar et al. | 370/248 |
| 2006/0259583 A1 | 11/2006 | Matsuura | |
| 2007/0050843 A1 | 3/2007 | Manville et al. | |
| 2007/0071243 A1* | 3/2007 | Nanda | 380/277 |
| 2007/0079376 A1* | 4/2007 | Robert et al. | 726/23 |
| 2007/0183375 A1* | 8/2007 | Tiwari | 370/338 |
| 2007/0294755 A1* | 12/2007 | Dadhia et al. | 726/11 |
| 2007/0298720 A1* | 12/2007 | Wolman et al. | 455/66.1 |
| 2008/0070549 A1* | 3/2008 | Wang | 455/411 |
| 2008/0248879 A1* | 10/2008 | Smith | 463/42 |
| 2008/0298330 A1* | 12/2008 | Leitch | 370/338 |
| 2009/0178110 A1* | 7/2009 | Higuchi | 726/1 |
| 2012/0324562 A1* | 12/2012 | Bansal et al. | 726/11 |

OTHER PUBLICATIONS

What Is, "What's DHCP," downloaded on Feb. 5, 2007 from http://searchvoip.techtarget.com/sDefinition/0,290660.sid66_gci213894.

Open Source, "What is—open VPN"< downloaded on Feb. 5, 2007 from http://searchopensource.techtarget.com/sDefinition/0,290660,sid39_gci.

what is.com "Wired Equivalent Privacy," downloaded from whatis.com definition on Mar. 2, 2007.

what is.com "Wi-Fi Protected Access," downloaded from whatis.com definition on Mar. 2, 2007.

USPTO; recent examination correspondence in related U.S. Appl. No. 11/684,067; filed by Riva Prakash Bansal on Mar. 9, 2007.

Tyson, Jeff, "How Stuff Works", downloaded on Feb. 5, 2007 from http://computer.howstuffworks.com/firewall.htm/printable.

WhatIs, "What's DHCP", downloaded on Feb. 5, 2007 from http://searchvoip.techtarget.com/s Definition/0,290660,sid66_gci213894.

Open Source, "What is—open VPN", downloaded on Feb. 5, 2007 from http://searchopensource.techtarget.com/s Definition/0,290660,sid39_gci.

USPTO; recent examination correspondence in related U.S. Appl. No. 11/684,067, filed Mar. 9, 2007, currently under examination.

USPTO; Examination Correspondence from a Related U.S. Appl. No. 11/684,067; filed Mar. 9, 2007 by Ravi Prakash Bansal.

USPTO; recent examination correspondence from related U.S. Appl. No. 11/684,067, filed Mar. 9, 2007, by Ravi Prakesh Bansal.

Microsoft; "NetworkInterfaceType Enumeration"; retrieved online from http://msdn.microsoft.com/en-us/library/system.net.networkinformation.networkinterfacetype.aspx on Dec. 30, 2010.

Bansal, R.; recent examination correspondence in related U.S. Appl. No. 11/684,067, filed by Ravi Prakash Bansal on Mar. 9, 2007.

Lloyd, B.; "PPP Authentication Protocols", RFC 1334, retrieved on Mar. 8, 2010 from http://tools.ietf.org/pdf/rfc1334.pdf.

USPTO; third office action in related U.S. Appl. No. 11/684,067, filed Mar. 9, 2007, by Ravi Prakash Bansal.

Bansal; related continuation application and preliminary amendmentin U.S. Appl. No. 13/591,457, filed Aug. 22, 2012 and Aug. 31, 2012 respectively.

Phifer, Lisa; "End-toEnd Security: Don't Overlook PDA's"; retrieved on May 2, 2013 from http://www.corecom.com/external/livesecurity/securepda.htm.

Enterasys; "Smartphones and Tablets in the Enterprise: Managing BYO Device Programs"; retrieved on May 2, 2013 from http://www.enterasys.com/company/literature/byo-device-programs-sab.pdf.

Spamlaws; "Common Backdoors Hackers Use to Access Networks"; retrieve on May 2, 2013 from http://www.spamlaws.com/backdoor-hacking.html.

* cited by examiner

METHOD TO APPLY NETWORK ENCRYPTION TO FIREWALL DECISIONS

CROSS-REFERENCE TO RELATED APPLICATIONS (CLAIMING BENEFIT UNDER 35 U.S.C. 120)

None

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None

BACKGROUND OF THE INVENTION

1. Field of the Invention

The present invention relates generally to an improved firewall system and method with particular application to dynamic computing environments.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

Firewall products, which are often distributed as software application programs, can be considered to fall into one of two broad categories: corporate network firewalls and personal firewalls. Corporate network firewalls, also referred to as sub-net firewalls, monitor traffic at a network bottleneck, such as at a point where a corporate intranet interfaces to the Internet. At this position, all of the computers on the corporate intranet can be protected from threats outside the intranet originating from the Internet. This is a cost effective and efficient solution for corporations, whereas firewall products must only be installed and administered at the one or more key networking interfaces between the intranet(s) and the Internet. Addition of a wireless network portion to the corporate intranet can pose a "backdoor" vulnerability to the intranet, whereas any computer with a wireless network interface which connects to and accesses the intranet may also act as a wireless bridge to another wireless network, such as a neighboring corporate network or a hacker's wireless computer.

The second broad category of firewall product is a "personal" firewall. These products are provided by companies such as Symantec (e.g. Norton), McAfee, Computer Associates, and Kerio. These firewalls run directly on a computer, such as a computer with a wireless network interface. Some are distributed or provided as separate application program, while others, such as Microsoft's Windows™ firewall are embedded in an operating system. Whereas the firewall protects the computer from threats coming from its wireless or wired network interfaces, it's configuration, preferences, and performance is limited and may not match or be equal to that of a corporate network firewall. Further, many companies find it cost prohibitive to outfit and administer every computer, or every mobile computer, in their corporation with a personal firewall installed directly on each computer.

But, current personal computer firewall products lack features needed to securely access trusted resources of another computer in a dynamic computing environment, such as an environment containing mobile personal computers ("PC").

Thus far, many corporations require by policy personal firewall software operate on employee's computers to prevent various software security threats such as "trojan horse" programs, viruses, and the like, from spreading between computers within the corporation. It is common for one mobile PC to often require access to another computer for a variety of reasons, including backing up of software, mirroring, remote control software, input device sharing, etc. Additionally, the mobile computers need access to workstations in a variety of locations, including workstations physically near the mobile PC (e.g. computers on the same subnet), at home using a VPN, or offices around the world.

Present personal firewall technology has not yet securely solved these access problems related to inclusion of a mobile device in a computing environment. Current personal firewall software allows users to restrict network access to trusted computer resources in several methods. For example, entire networks can be either trusted or untrusted. Additionally, specific ports and hosts can be trusted by either Internet Protocol ("IP") or host name.

Unfortunately, in a dynamic and mobile computing environment where mobile computers can present themselves into or onto a trusted network for a limited period of time, then leave the network, returning at some time later again, the IP address of a mobile PC often changes.

Another method employed by some personal firewalls is to establish trust relationships by Media Access Control ("MAC") address. However, MAC addresses are not transferred across subnets, thereby limiting this method's use to computers which are always located on the same subnet.

Some current personal firewalls can be set up to trust an entire range of IPs, but trusting more IPs than necessary is also security risk. Technologies such as Dynamic Host Configuration Protocol ("DHCP") attempt to provide a more convenient, centralized point of administration of IP addresses, with some provision of automatic assignment of IP addresses, and automatic expiration and re-use of IP addresses. Through configuration of short address "lease" times, IP addresses can be more efficiently utilized, and some security enhancements are realized, but still the networked resources remain vulnerable to certain modes of threat.

Still another method to enable communication between hosts is to "tunnel" that communication via a Virtual Private Network ("VPN"), such as open VPN, or through Secure Shell ("SSH"). There are also shortcomings of each of these approaches. First, VPN servers or tunneling SSH sessions are difficult to setup for the typical computer user. Second, additional work and expertise is required to maintain the VPN or SSH server. And, the user must manually re-establish the VPN or SSH tunnel prior to accessing resources on the target computer or setup programs such as "autossh" to re-establish the connection automatically. Further, not all application programs are able to fully function within either a VPN or SSH tunnel.

So, for the forgoing reasons, corporate, government, and individuals with a desire for security and privacy in networks need to make sure all the components in a network are as secure as possible.

However, still another link in the chain that is currently unprotected is related to wireless networking encryption controls. The problem is that while many such groups and individuals may require or expect everyone on the network to be using an encryption standard that is deemed sufficient, such as Wired Equivalent Privacy ("WEP"), Wi-Fi Protected Access ("WPA"), and IEEE 802.11i (a.k.a. "WPA2"), or any other or future protocol), there is currently no way for these groups and individuals to know and take action when someone on the network is not adhering to the required standard.

SUMMARY OF THE INVENTION

The present invention includes system embodiments as well as methods for providing a handler for requests to access a wireless network, operable by or separate from an enhanced personal firewall system, which obtains connection-related information from the operating system, network interface drivers, or both, and then provides that information to a controller which determines to allow or deny access. By collecting certain connection-related information, new levels and granularities of control are allowed and enabled. The process is equally well suited for implementation by a wireless device which may be in range of multiple servers or networks, such that the device may allow different levels of access to the device by the different servers or networks according to the collected connection-related information.

BRIEF DESCRIPTION OF THE DRAWINGS

The following detailed description when taken in conjunction with the figures presented herein provide a complete disclosure of the invention.

DETAILED DESCRIPTION OF THE INVENTION

Figure 1:
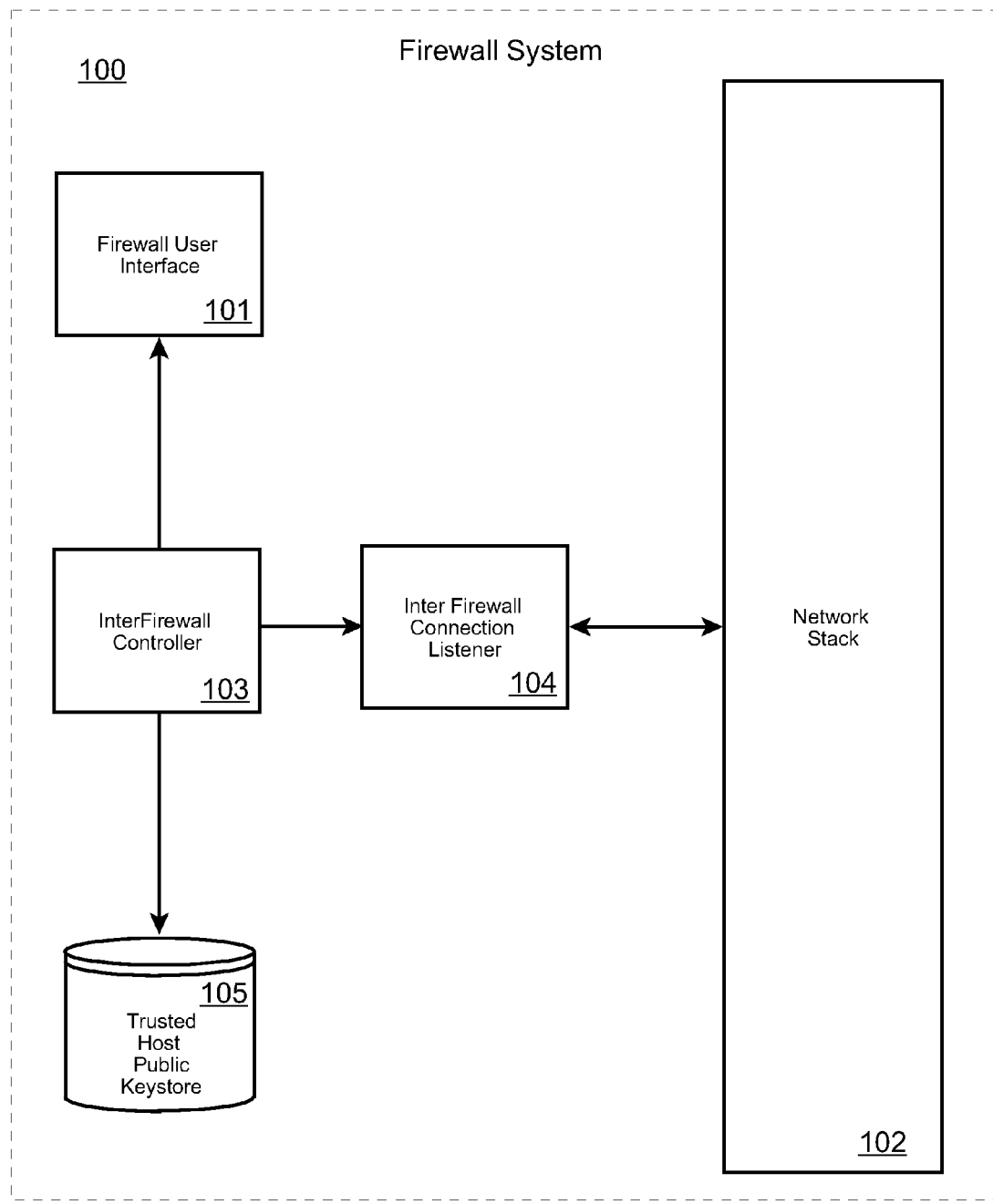
FIG. 1 is a component interaction diagram of a firewall according to the related invention.

The inventors of the present and related inventions have recognized problems unaddressed in the art regarding firewall protection of mobile computing devices in a dynamic computing environment.

The related invention provides methods to enhance and improve client firewall software to enable a computer to securely access the resources of another computer in a dynamic computing environment. For the purpose of this disclosure, a dynamic computing environment refers to a computing environment in which at least one client computer, such as a PC, has one or more of the following attributes: (a) non-static IP address, (b) moves between subnets, or (c) accesses computing resources from a VPN. Secure access is enforced by using private/public keypairs for computer authentication and authorization.

The present invention solves the aforementioned problem regarding enforcement, or at least notification of administrators, of corporate or private policies regarding minimum levels of wireless network protection for all components within the wireless network at any time, including mobile components which may arrive into the network and which may leave the network semi-autonomously (e.g. without administrator action). To these ends, the present invention provides a method and system to pass and obtain the wireless connection security information to a firewall, preferably but not necessarily an enhanced firewall according to the related invention. The passed information contains sufficient detail to enable the firewall to determine the method of client connection, including security protocols and security measures, thereby allowing the connection type as an option or parameter for the decision to allow the mobile device to connect to the wireless network, and to use any or all of the networked resources (e.g. printers, hard drives, file systems, etc.).

Using the present invention, users and administrators enabled to, for example, designate that a connecting device do so by either wired connection or by wireless connection with WPA2 encryption, but otherwise block the traffic.

As such, the present invention extends upon, or can be used separately from the related invention, as will be evident in the following paragraphs. For these purposes, the disclosure relevant to the related invention is included herewith, followed by details of the present invention.

Novelty and Non-Obviousness of the Approach of the Related Invention

Whereas in one embodiment the present invention is combined or extended from the related invention, the novel and non-obvious aspects of the related invention also apply to the present invention in such an embodiment.

The related invention allows operators using mobile computing devices to access resources from multiple locations without relaxing security measures, where known products require users to either disable the client firewall or trust a larger percentage of the network than is necessary, which results in compromised computer security.

As will be evident from the following paragraphs, the related invention brings together several security techniques in a non-obvious manner to facilitate secure network communication in a dynamic computing environment. The elements combined are personal firewall software, public/private secure keypairs, Transmission Control Protocol/Internet Protocol ("TCP/IP") communication, network clients and binding servers. To demonstrate that it is presently unknown and unsuggested by those skilled in the art to create a system to allow for secure network communications in a dynamic computing environment according to the related invention, the following patents are considered. The following issued patents and published patent applications address similar problems, but none have either recognized the source of the threats recognized by the inventors, solved the vulnerabilities solved by the related invention, or both.

For example, US Published Patent Application 2003/0167405 to Freund et al., and US Published Patent Applications 2003/0097590 to Syvanne, are both firewalls which employ the use of "sets of firewall rules." These firewalls are described as determining which particular "set of rules" to activate based on the "physical location" or the "network profile." One disadvantage of these firewalls is that any given set of rules is "static" and predetermined. Therefore, if a target computer with which a source wished to communicate was not designated as a trusted computer in the target computer's currently activated rule set, then a communication would be denied by the Freund or Syvanne firewalls. As will be evident from the following paragraphs, the related invention allows more granular communication decisions to be made as the method described allows the two computers to configure their firewall rules at the level of individual source and target computers by making use of their authenticated identities.

Still another example is U.S. Pat. No. 6,609,154 to Fuh, et al. Fuh's firewall or boundary device intercepts traffic between a client and the network resource and only allows the client to reach the network resource after the client passes an authentication challenge. Fuh's approach involves Hyper Text Transfer Protocol ("HTTP") communication between the client and the network resources and would be exemplified in scenarios such as when client computers are accessing web servers that are protected by a firewall that requires the client user to type in a user name and password in an HTML dialog box before access can be granted. As will be seen in the following paragraphs, Fuh's principles of operation are considerably different from those of the related invention wherein the related invention involves authenticated communication between two peer computers across firewalls.

Yet another example is U.S. Pat. No. 6,804,783 to Wesinger, Jr., et al. Wesinger's approach is similar to password-based access of network resources as that used by Fuh, involving a "access key" that is communicated to the user via a pager, phone or fax. According to their patent, upon receiving the key, Wesinger's system requires the user to enter the said key into the system before a connection can be established. However, this method is considerably inconvenient. As will be seen in the following paragraphs, the related invention utilizes a more automated and secure public/private key method for authentication than that of Wesinger's system.

Another published United States Patent Application 20030055962 to Freund, et al., uses an approach in which a router periodically checks if the client computers are connected to it are "authorized" to access the "outside world." As will be seen in the following paragraphs, the related invention is substantially different from Freund's second system by utilizing authenticated communication between two peer computers across firewalls.

U.S. Pat. Nos. 7,136,645 to Hanson, et al.; 7,088,727—Short, et al., and Ferreria, et al., describe intermediary devices which intercept network packets and modify them so that a mobile device can maintain communication with various disparate networks without reconfiguration. These systems, and others like them, are considerably different from the related invention in that they do not utilize authenticated communication between two peer computers across multiple firewalls.

Component Interactions According to the Invention

Turning to FIG. 1 in which components are arranged (100) and provided according to the invention, a conventional personal firewall user interface (101) and a conventional network protocol stack (102) are provided with new components, including an Inter Firewall controller (103), an Inter Firewall Connection Listener (104), and a Trusted Host Public Keystore (105), as shown.

The firewall user interface component of enhanced firewall interacts with the user, allowing the user to modify the settings and operation of the firewall software. Additionally, preferably similar to other firewalls, the firewall user interface displays the status of the firewall along with information and warning messages. However, according to the related invention, the user interface component is modified to support prompting the user to add a host to its list of trusted hosts.

The network stack is the component of the firewall software that interrogates outgoing and incoming network packets and applies firewall rules against them to either allow or deny the packet access to or from the host. According to the related invention, and in one available embodiment, a conventional network protocol stack is modified and enhanced to allow the new Inter Firewall Connection Listener component to bind to a specified port and to accept incoming transmissions from other host firewalls.

The Inter Firewall Connection Listener component is designed to bind to a specified port to listen for incoming firewall trust requests. Once a connection has been detected, control is passed to the Inter Firewall Controller.

According to one embodiment of the invention, the Inter Firewall Controller component contains the program logic to determine if an incoming trust request should be honored, as described in more detail in the following paragraphs.

Finally, a trusted host public keystore component comprises a nonvolatile datastore that allows multiple entries to be stored, indexed and searched. Additionally, the datastore allows information to be associated with entries.

Network Interactions

Figure 5:
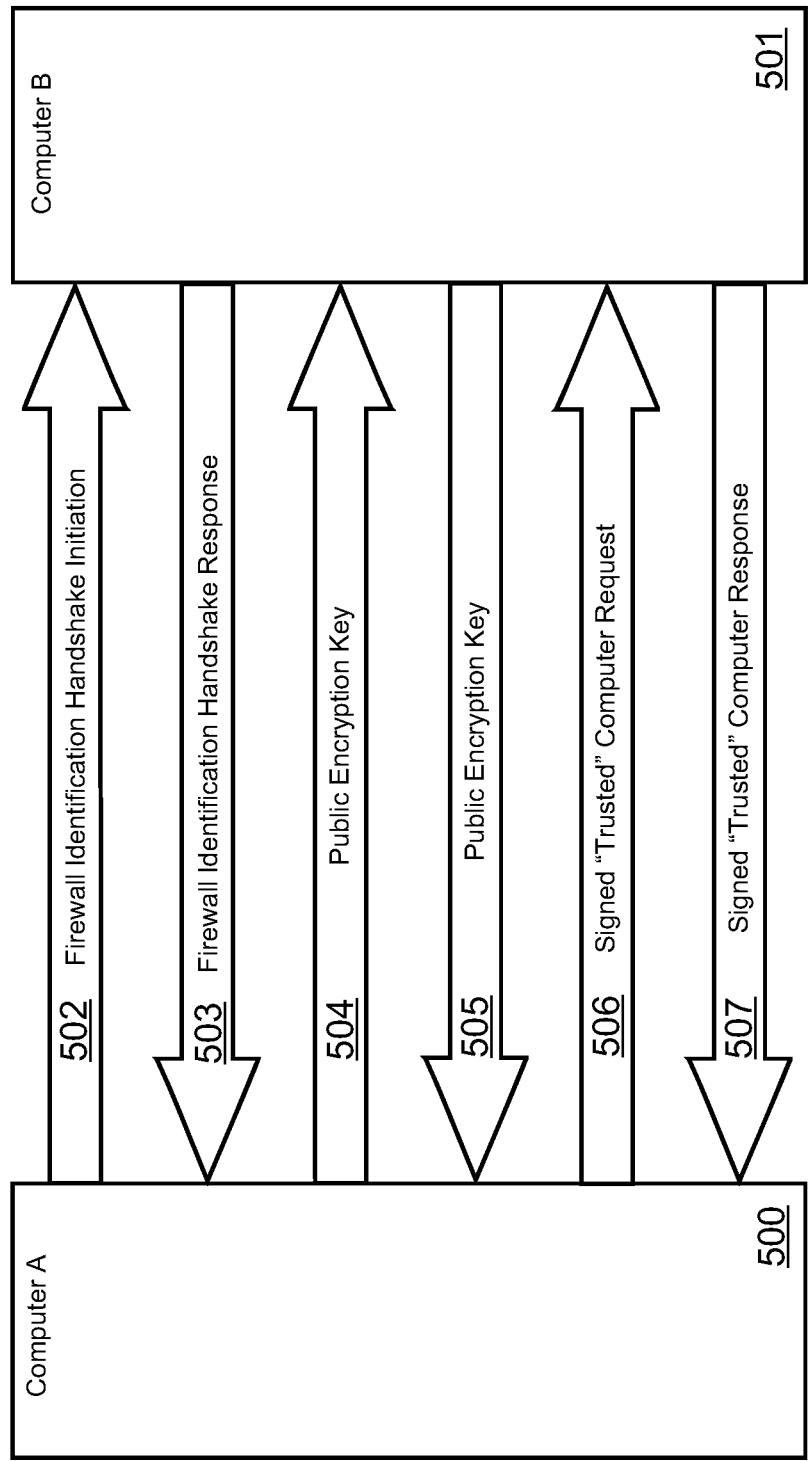
FIG. 5 illustrates the network interactions between two computers according to the related invention.

FIG. 5 illustrates the network interactions between two computers (500, 501) according to the methods of the related invention. Initially, one computer (500) transmits a Firewall Identification Handshake Initiation (502) to the second computer (501). The second computer responds (503), followed by exchange of public encryption keys (504, 505). Then, the initiating computer (500) transmits a signed trusted computer request (506) (e.g. a request to access the second computer as a trusted accesser). The target computer (501) then responds with a signed trusted computer response (507).

The content and interpretation of each of these steps are described further in the following paragraphs concerning the logical processes of the invention.

Logical Processes of the Related Invention

Figure 6:
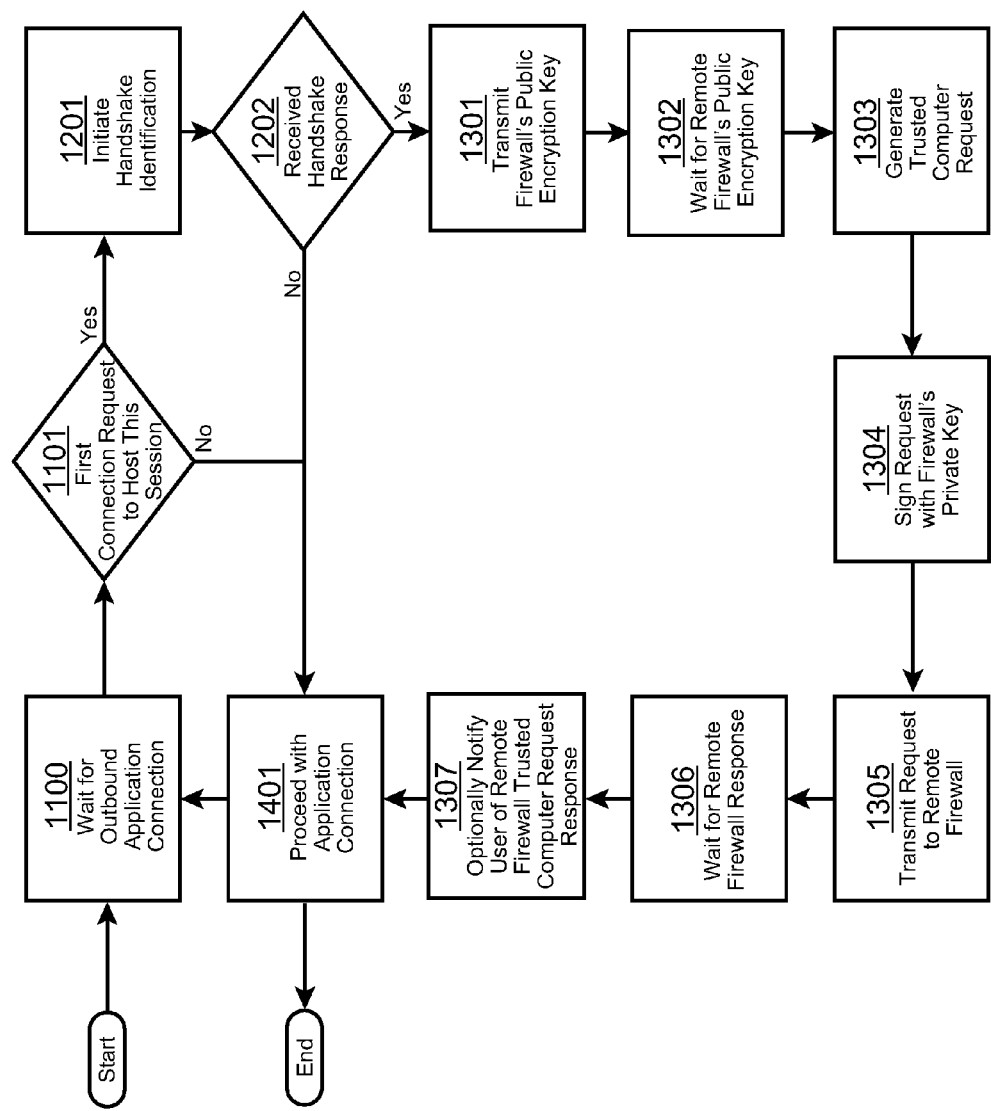
FIG. 6 shows a logical process according to the related invention for handling an outbound network connection.
Figure 7:
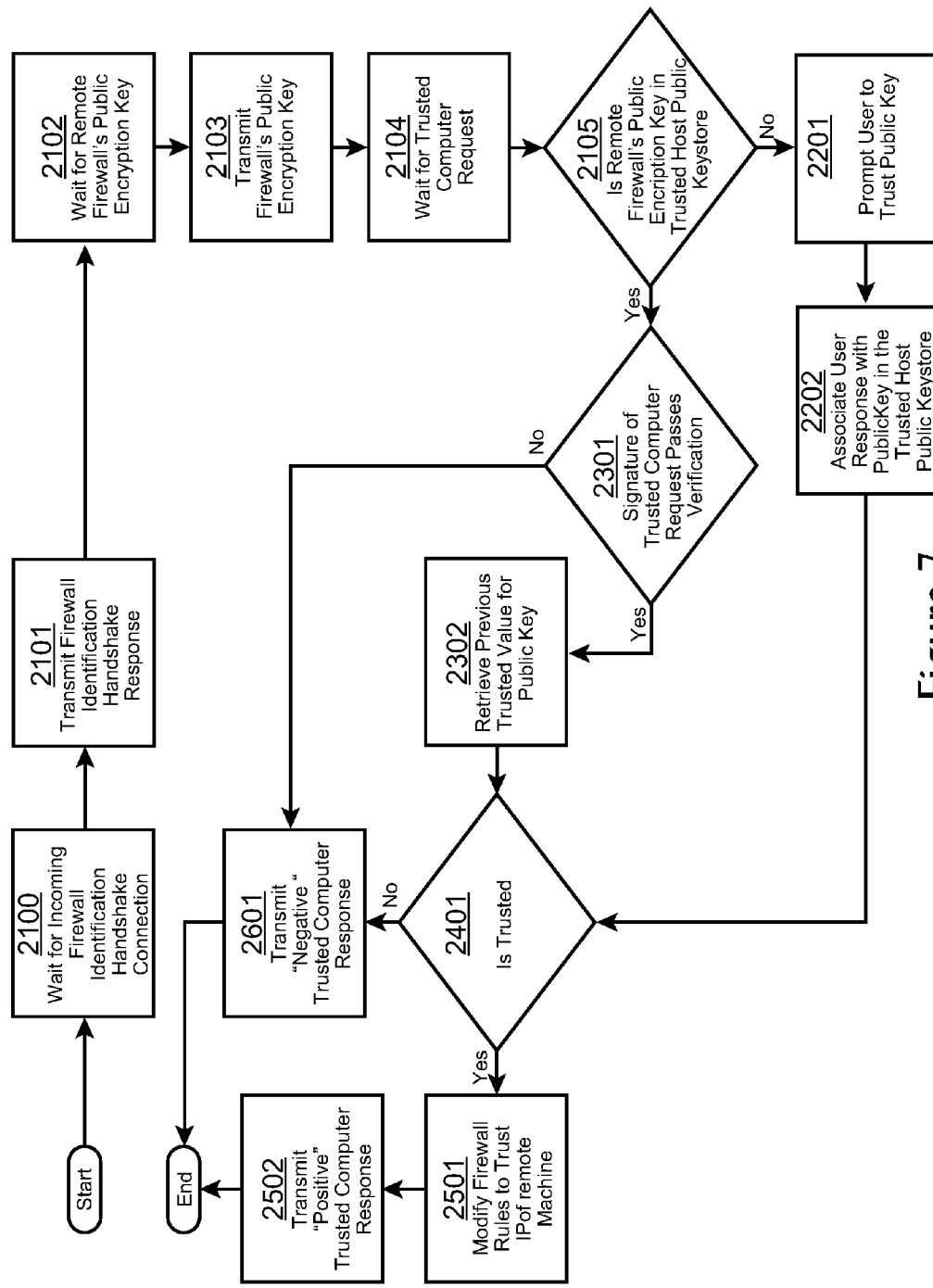
FIG. 7 shows a logical process according to the related invention for handling an inbound network connection.

FIGS. 6 and 7 illustrate logical processes according to the related invention. An outbound connect is established according to a logical process such as that shown in FIG. 6:

Step 1100: As in conventional personal firewalls, the enhanced personal firewall logic waits for outbound network connections from applications or the operating system. In addition to the logic of conventional firewalls, upon outbound connection detection step 1101 is invoked.

Step 1101: A datastore is checked by the logic to determine if this is the first time that during this session that a connection has been attempted to the target host. The definition of session may vary by embodiment, but some examples include: since the firewall program has started, since this computer has had its current IP, or potentially a time duration. If yes, then step 1201 is engaged. If no, step 1401 is engaged since the results from repeating the procedure starting at step 1201 will not change the outcome of the logical flow.

Step 1201: A handshake connection to the remote host is attempted. This requires an established port standard for inter-firewall communication. The connection message establishes the firewall clients intention of requesting a trusted relationship between the two computers. Additionally, the request may include supported protocol versions, and acceptable key algorithms. After transmitting the request the program continues to step 1202.

Step 1202: If the connection fails or a timeout occurs, the program jumps to step 1401 determining that the target host is not configured to establish trusted firewall couplings. At this point regular firewall rules are engaged. If the software receives an acknowledgment from the remote host step 1301 is engaged.

Step 1301: The firewall software transmits its public encryption key. The public/private encryption key pair has been generated earlier, potentially during installation or first program execution. The key pair is preferably generated using known processes such as Diffe-Hellmen or other key pair generation routines. After transmitting its public key the logic engages step 1302.

Step 1302: The logic waits to receive the public key of the remote firewall software. After receiving the public key from the remote firewall, the program continues to step 1303.

Step 1303: A request to be a trusted host of the remote firewall is generated. This request may include information such as the name of the host requesting trust, the username and email address of the trust requester, etc. Once the request is generated it is sent to step 1304.

Step 1304: The trusted host request is signed by the firewall's private key. Once signed the previously transmitted public key can be used to verify that this request was generated by the corresponding private key belonging to this firewall software. Step 1305 is invoked once the request has been signed.

Step 1305: The generated and signed request is transmitted by the system to the remote host process. Once transmitted, control continues to step 1306.

Step 1306: The program waits for a response from the remote host. The response must include a Boolean variable indicating if trusted access is granted or denied. However, in other embodiments, additional information such as a time duration that the trust is valid for, etc., may be included. Once received the optional step 1307 may be invoked, otherwise logical flow moves to step 1401.

Step 1307: This optional step is used to notify the computer's operator if a trust relation has been established. The notification can take several forms including dialog boxes, sounds, or status bar notifications. After step 1307 is executed, the logic moves to step 1401.

Step 1401: This step allows the requesting application or service to proceed with its connection to the remote host. This step is preferably always executed regardless of the outcome of any previous steps.

Upon completion, the logic returns to step 1100.

Turning to FIG. 7, a logical process according to the invention for handling an inbound connection request is shown:

Step 2100: The enhanced local firewall listens for incoming connections on the established standard port for inter-firewall communications. This requires that a socket has been bound to that port and is able to accept incoming connections. After receiving a connection the program continues to step 2101.

Step 2101: Once an incoming connection has been accepted and the remote firewall client has transmitted its firewall identification handshake, the logic responds by acknowledging receipt of the firewall identification handshake. This acknowledgment enables the remote invention to detect that this host is capable of negotiating trusted relationships. The response may include additional information such as protocol versions, acceptable key algorithms, etc. Once the response has been transmitted, processing continues to step 2102.

Step 2102: After transmitting the handshake response, the logic waits for the remote logic or firewall to transmit its public encryption key. After receiving the public key, step 2103 is invoked.

Step 2103: The enhanced local firewall transmits its public encryption key. The public/private encryption key pair has been generated earlier, potentially during installation or first program execution. The key pair is generated using known art such as Diffie-Hellman or other key pair generation routines. After transmitting its public key, the firewall engages step 2104.

Step 2104: The enhanced local firewall waits for the remote initiating program to request a trusted relationship with this program. Logical processing moves to decision step 2105 once the request has been received.

Step 2105: The enhanced local firewall checks its trusted host public key store to determine if this is the first time the remote host has requested a trusted relationship. If this is a new public key, step 2201 is engaged if this key has been previously received step 2301 is engaged.

Step 2201: The operator of the computer is prompted to allow or deny a trusted relationship with the remote host. After a response has been supplied, step 2202 is invoked.

Step 2202: The supplied remote public key is associated in a nonvolatile key store with the user response. This is the same key store that is consulted in step 2105. After association, processing continues at step 2401.

Step 2301: The signature of the trusted computer request received in step 2104 is preferably verified by using known methods that allow a program to verify signatures of messages signed by private keys using only the public key. If the signature can be verified, step 2302 is invoked, otherwise step 2601 is engaged.

Step 2302: The previous user-supplied response for host trust is retrieved from the nonvolatile key store and supplied to step 2401.

Step 2401: In this step, it is determined if the user presently or in the past indicated that this host, identified by its public key store, can be a trusted computing resource. If yes, processing proceeds to step 2501, otherwise step 2601 is invoked.

Step 2501: The firewall rules are modified to allow the present IP of the remote host access to trusted resources of this host. Processing now continues at step 2502.

Step 2502: A message is transmitted to the remote host indicating that its IP may now access trusted resources of this host. Step 2100 is now re-engaged to wait for additional requests.

Step 2601: A message is transmitted to the remote host indicating that its IP was denied access to trusted resources of this host. Step 100 is now re-engaged to wait for additional requests.

ALTERNATIVE EMBODIMENTS OF THE RELATED INVENTION

It will be apparent to those skilled in the art that the related and present invention is not limited to the exact example logical processes described in the foregoing paragraphs, and that there are many variations which fall within the spirit and the scope of the invention. For example, the invention can alternatively utilize a central server system for authentication and authorization to trusted resources of another host. In such an embodiment, the central server system would maintain a user defined list of trusted hosts. When a mobile computer changes IP addresses, it would update the central server system with its host ID (public key) and new IP address. The firewall logic would additionally check the central server system either periodically or on new incoming connections to determine which IPs are trusted.

In another embodiment, the trusted remote host IP addresses may be restricted to communication with only a specified subset of ports on the host. Alternatively, the trusted remote host IP addresses may only be trusted for only a specified period of time after authorization.

Still another embodiment variation provides that the computer which permitted a trusted relationship to be established may periodically, or on demand, request re-authorization of the client and remove any clients that do not re-authorize as a trusted host.

In yet another variation embodiment, the logic of the invention may be implemented as software which is developed as a program external to conventional firewall software such that it interacts and cooperates with the conventional firewall software execution on the machine via application programming interface ("API") calls or automated cursor and keyboard control.

The principles of the invention may also be applied to non-personal firewalls, such as corporate network or sub-net firewalls, as well.

Novelty and Non-Obviousness of the Present Invention

In addition to incorporating the foregoing novel aspects of the related invention in one available embodiment, the present invention provides further novel and non-obvious solutions to the problem regarding notification and decisions by network equipment based upon enforcement of wireless protocol security measures.

For example, US Published Patent Application number 2004/0090972A1 by Mark A. Barrett, et al., (hereinafter "Barrett") provides some of the background information describing wireless Local Area Networks ("LANs"), WEP, and Virtual Private Networks ("VPNs") pertinent to the background of the present invention. Barrett's disclosure teaches setting rules on subnet firewalls, which are router firewalls or boundary firewalls, based on the security classification (e.g. network traffic between "low" and "high" security classes) such that traffic must be encrypted lest the subnet firewalls will block the traffic going from a low security class to a high security class. However, Barrett is silent regarding a method to automatically determine the security class (e.g. association in theirs is a manual process), nor does Barrett teach a method to determine the encryption strength of the terminals to any hidden or unclassified gateways. Still further, Barrett is silent regarding teaching a method to accomplish enabling or blocking traffic to and from the terminal itself irrespective of whether it is connected to an enterprise managed network, but instead Barrett's process is dependent upon the terminals being connected to an enterprise managed network.

For example, consider Barrett's assumption that there are no unauthorized wireless routers applying Network Address Translation ("NAT") and connected to one of the fixed network ports. This assumption allows the risk that any device connected to this wireless router will be considered by Barrett's invention to be fixed (e.g. not mobile), whereas it truly isn't fixed, as indicated by this passage from the Barrett disclosure:

"By definition, the fixed terminals 252, 253 can be 'trusted' as they are connected to the fixed network and thus the security policies that are associated with the fixed VLAN(s) 230 allow the fixed terminals to access servers and network services available within the LAN and also for access to the external networks 205 via the firewall. The firewall 280 prevents unauthorized access from the external network to terminals and servers which are connected to the LAN."

The present invention, however, is directed towards a different purpose than Barrett's, but alternatively, the present invention could be added "on top" of Barrett's invention to resolve this gap in security coverage.

Logical Processes of the Present Invention

As previous stated, the present invention may, in one embodiment, be used to extend upon the functionality of the related invention, or it may be utilized separately and independently of the related invention. As such, the following logical processes may be implemented in part or whole in software executed by one or more processors, in circuitry, or a combination of software and circuitry.

According to one embodiment of the invention, two components are provided: (a) a modification or addition to the Operating System of the wirelessly networked client's computing platform, VPN software, or another client program which regulates connection to another device, and (b) a modification or addition to a server receiving the wireless connection, such as a VPN server or a firewall program, and especially such as the enhanced firewall of the related invention.

Figure 8:
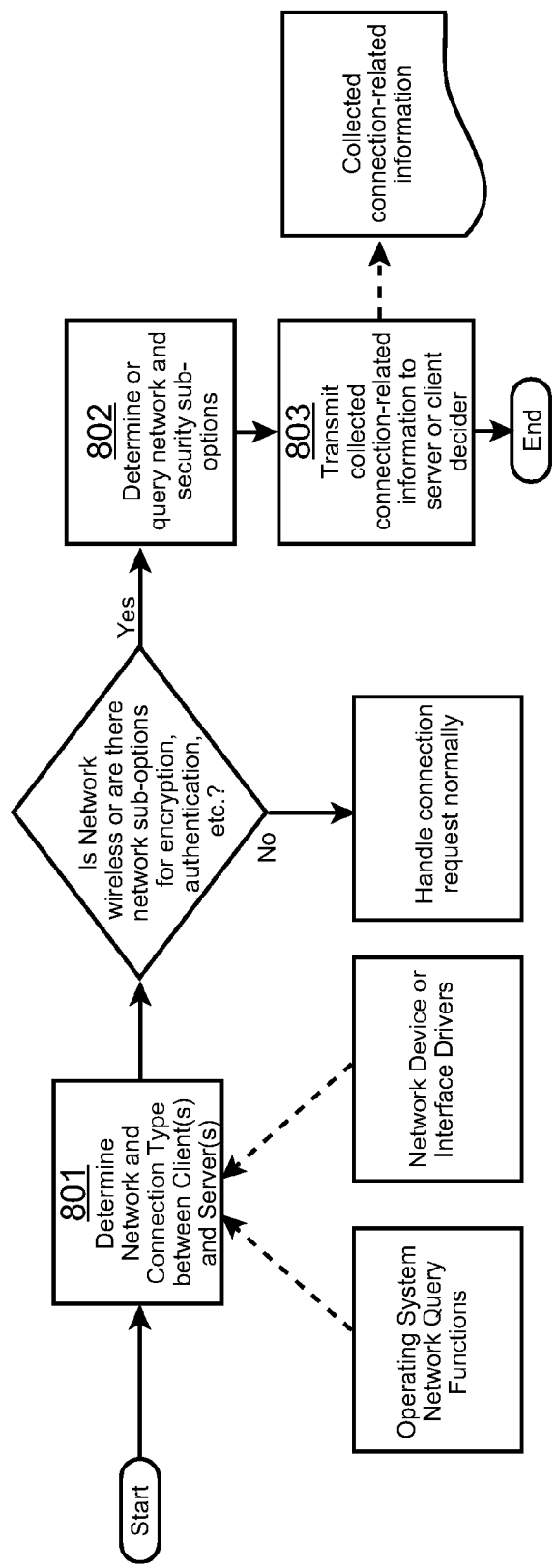
FIG. 8 shows a logical process according to the present invention for obtaining or collecting connection-related information responsive to a connection request to a wireless network or a network employing security measures.

Modifications to the wireless client include some or all of the following, as shown in FIG. 8:

Step 801: Logic, such as software, is added to the client to determine the network and connection type from the Operating System or network device drivers. For example, in Windows, a Windows Management Interface (WMI) call to the NetworkInterfaceType enumeration of the System.Net.NetworkInformation namespace. See, for example, the list of members for this enumeration published by Microsoft, where "Wireless80211" is the member that would denote the client device is connected wirelessly. In the case of multiple network connections, the logic preferably regulates that traffic flow over the more secure interface.

Step 802: If the network type is Wireless or other type where there are sub-options in terms of connection, such as a form of encryption, then the added logic determines that information from the Operating System or network device drivers. For example, in a Microsoft Windows™-based system, the logic can query the status of the NDIS OID_802_11_AUTHENTICATION_MODE, which returns information such as Ndis802_11AuthModeWPA2 or Ndis802_11AuthModeWPA2PSK for WPA2.

Step 803: This connection-related information is then preferably forwarded to a server, such as a firewall server, for further disposition.

Figure 9:
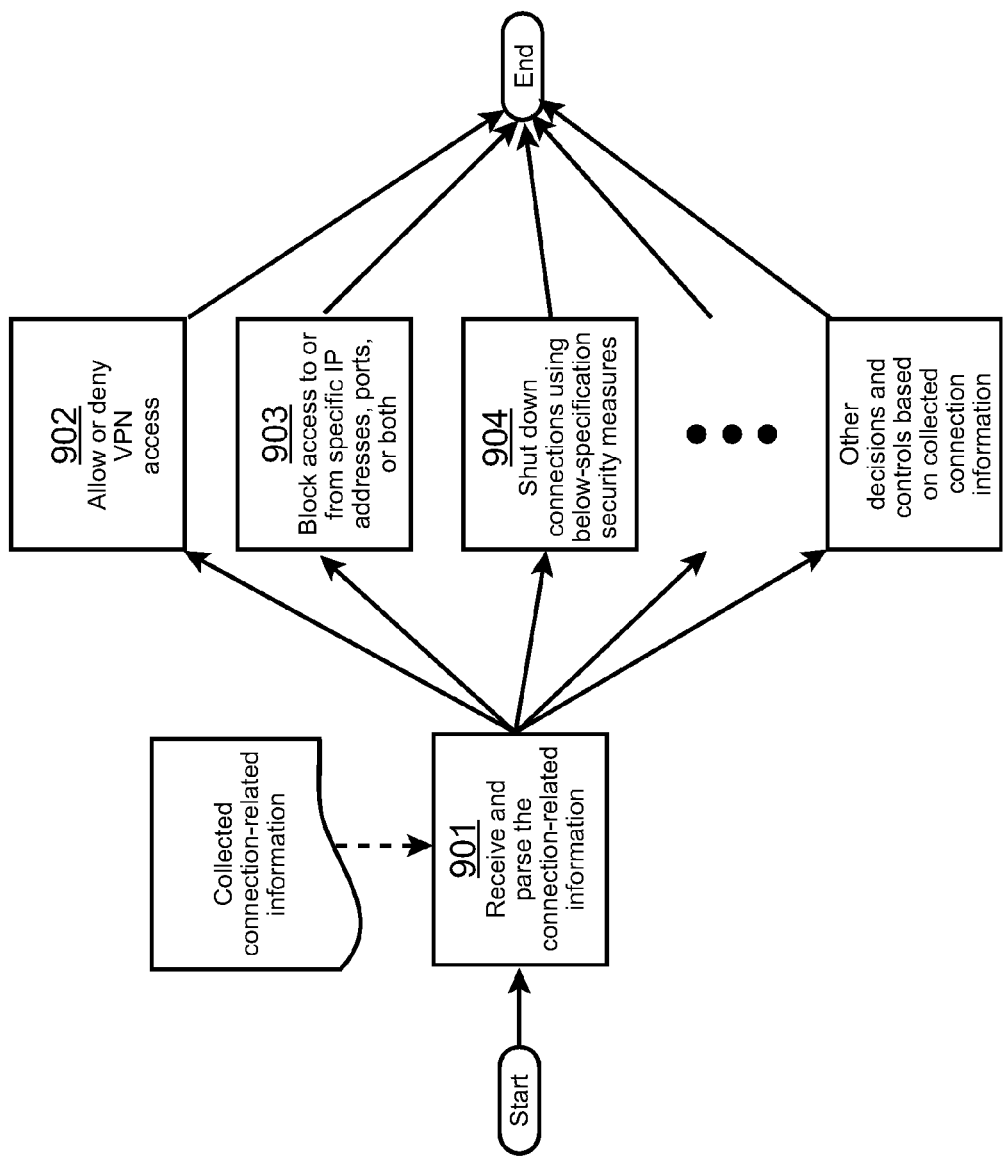
FIG. 9 shows a logical process according to the present invention for deciding whether or not to grant the access request relative to FIG. 8, and if so, how to implement the granted request or subsequent accesses.

Modifications to a server, such as a firewall server or proxy server, include some or all of the following, as shown in FIG. 9:

Step 901: Parse the connection-related information, and proceed with one or more of the steps 902-904.

Step 902: Using the parsed connection-related information, a VPN server may determine whether or not to deny access to a VPN connection request if the user or client device is connecting via an unencrypted channel.

Step 903: The server can block access to or from certain IP addresses, ports, or both, by an application program running on the client device if the client is currently connected via an insecure network. This approach is fundamentally different than the technique of providing Trusted/Non-Trusted firewalls in that, with this new technique, a network can be declared to be Trusted while still being in fact unencrypted, and therefore deemed unacceptable by a user or an administrator of this program. This can, for example, prevent a user from using a corporate email or instant messaging program when others are able to more easily intercept unencrypted packets.

Step 904: A server controlling a corporate network can shut down the connections of anyone (or any client device) using an unencrypted wireless access point, be it rogue or accidentally misconfigured connection.

The above processes may be reversed wherein the client also makes such decisions based on the connection type (e.g. the server and client roles are essentially reversed). For example, if a client wishes to refuse connection to wireless network servers that are currently transmitting over an unencrypted wireless connection, the client may do so. The above steps use Windows terminology and interfaces, but the same concepts apply to any operating system, and any wireless network technology or protocol.

Suitable Computing Platform

In one embodiment of the invention, the functionality of the enhanced firewall, including the previously described logical processes, are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Therefore, it is useful to review a generalized architecture of a computing platform which may span the range of implementation, from a high-end web or enterprise server platform, to a personal computer, to a portable PDA or web-enabled wireless phone.

Figure 2A:
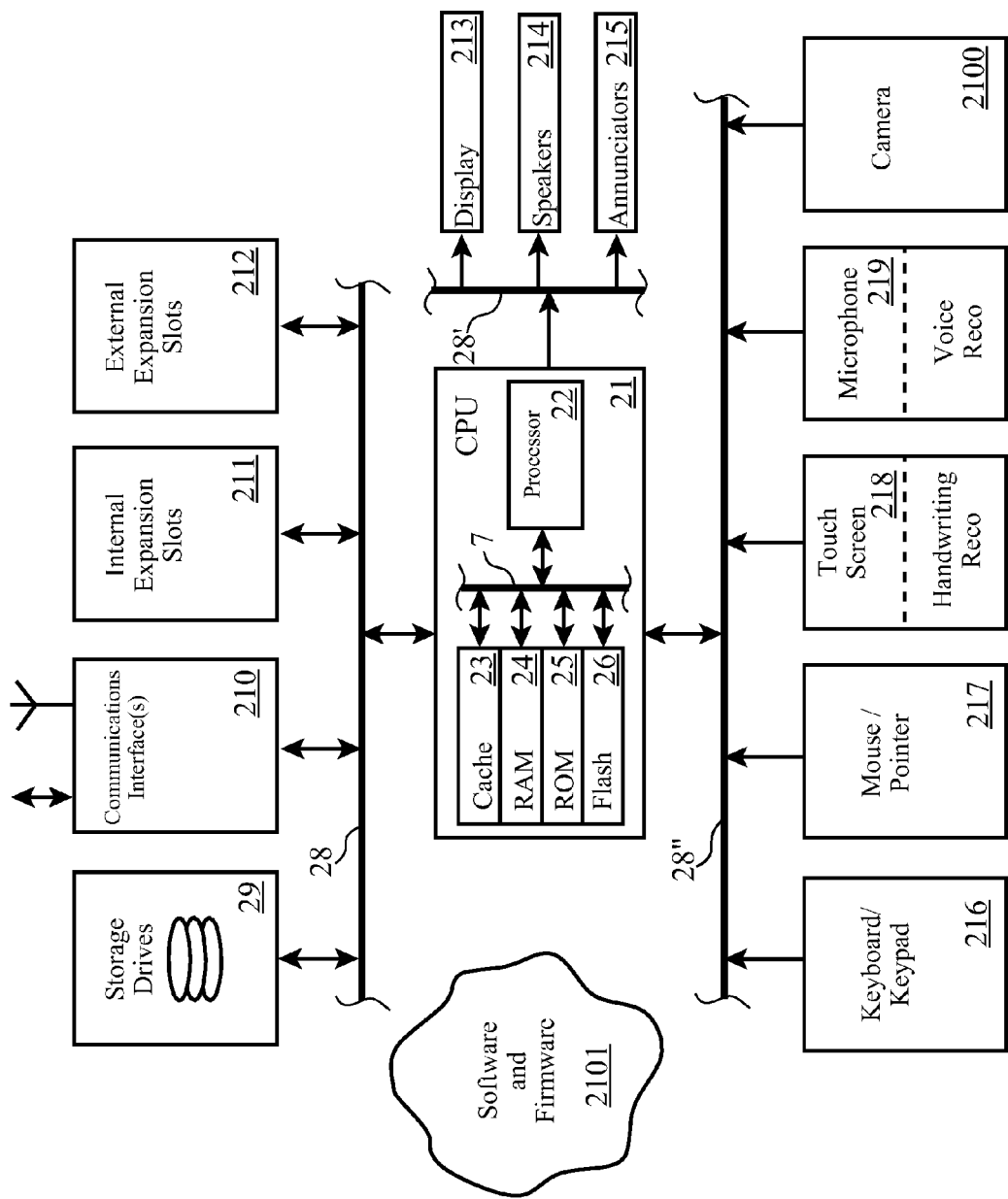
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Tomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
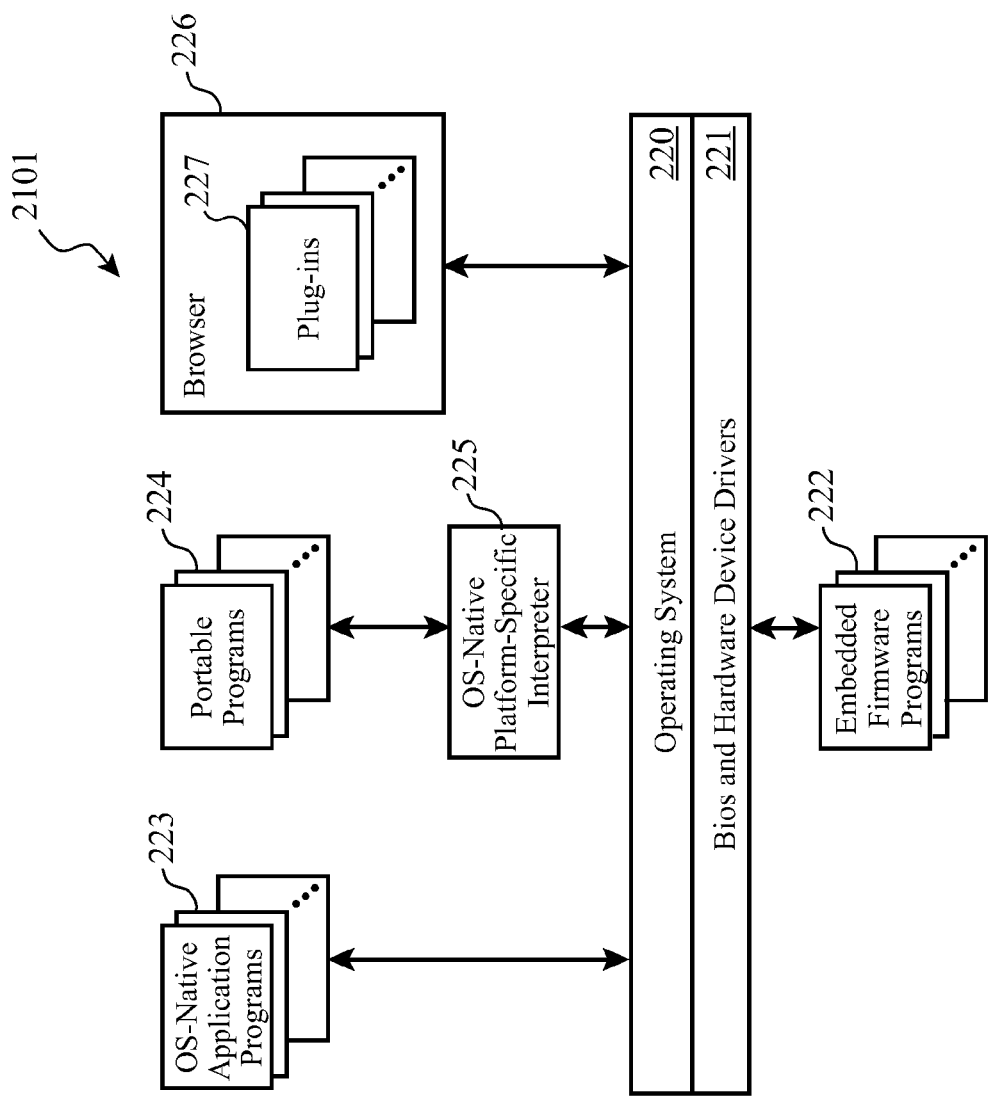

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as realtime operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include some or all of the foregoing logical processes and functions of the invention being provided by configuring software, deploying software, downloading software, distributing software, or remotely serving clients in an on demand environment.

Software Deployment Embodiment

According to one embodiment of the invention, the methods and processes of the invention are distributed or deployed as a service by a service provider to a client's computing system(s).

Figure 3A:
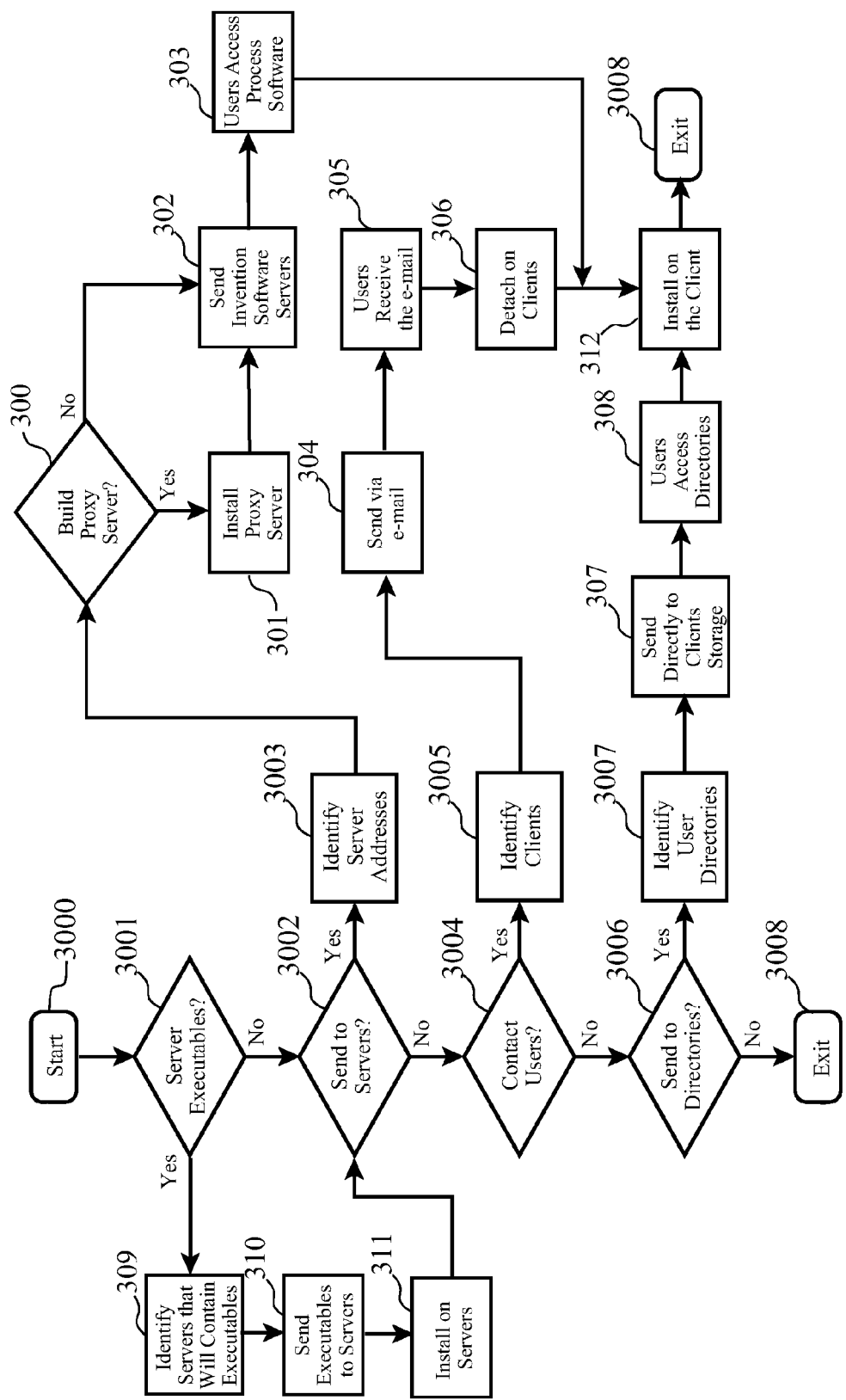
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment

According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
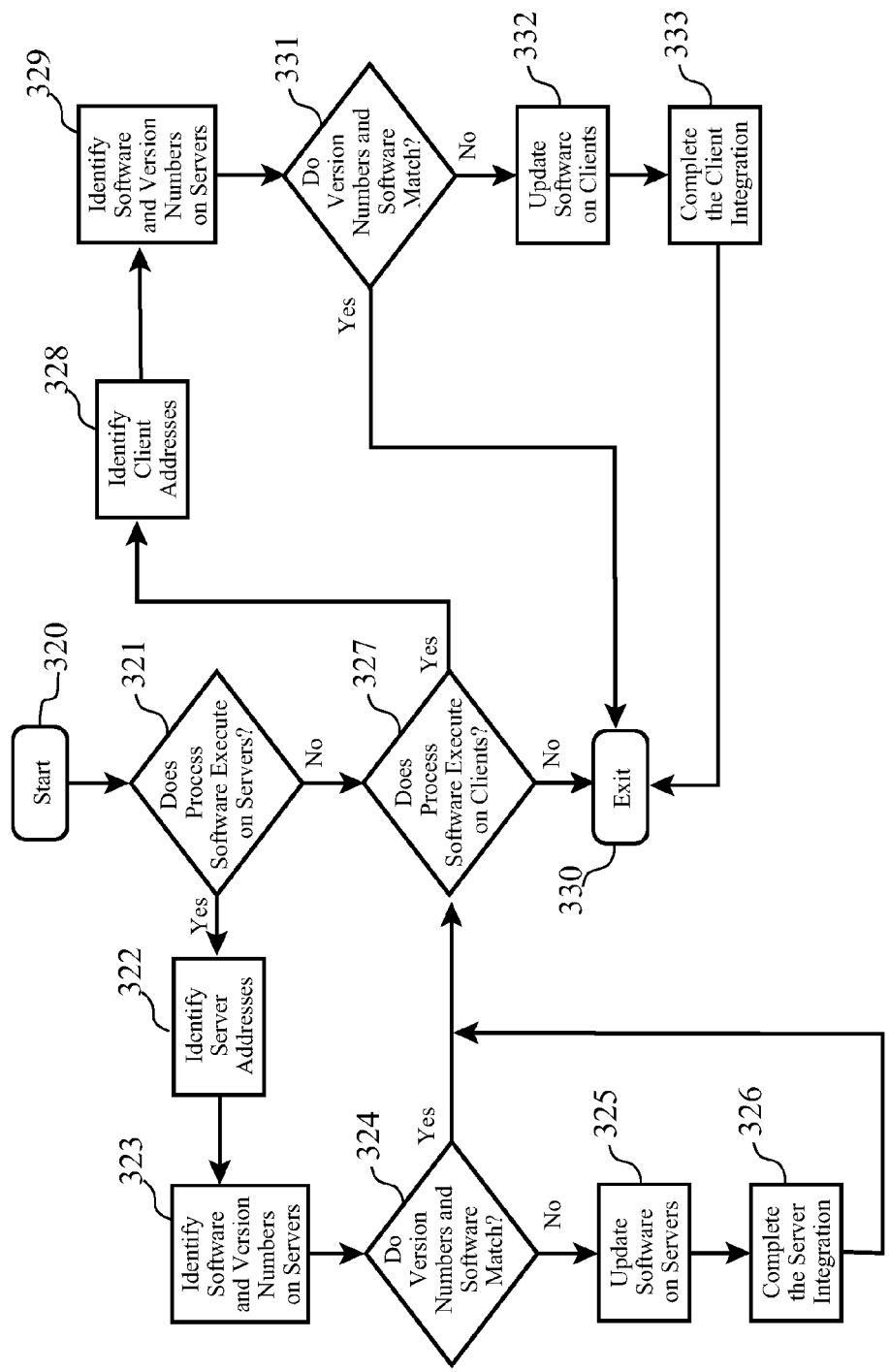
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment

In another embodiment, the invention may be realized as a service or functionality available to other systems and devices via an Application Programming Interface ("API"). One such embodiment is to provide the service to a client system from a server system as a web service.

On-Demand Computing Services Embodiment

According to another aspect of the present invention, the processes and methods disclosed herein are provided through an on demand computing architecture to render service to a client by a service provider.

Figure 3C:
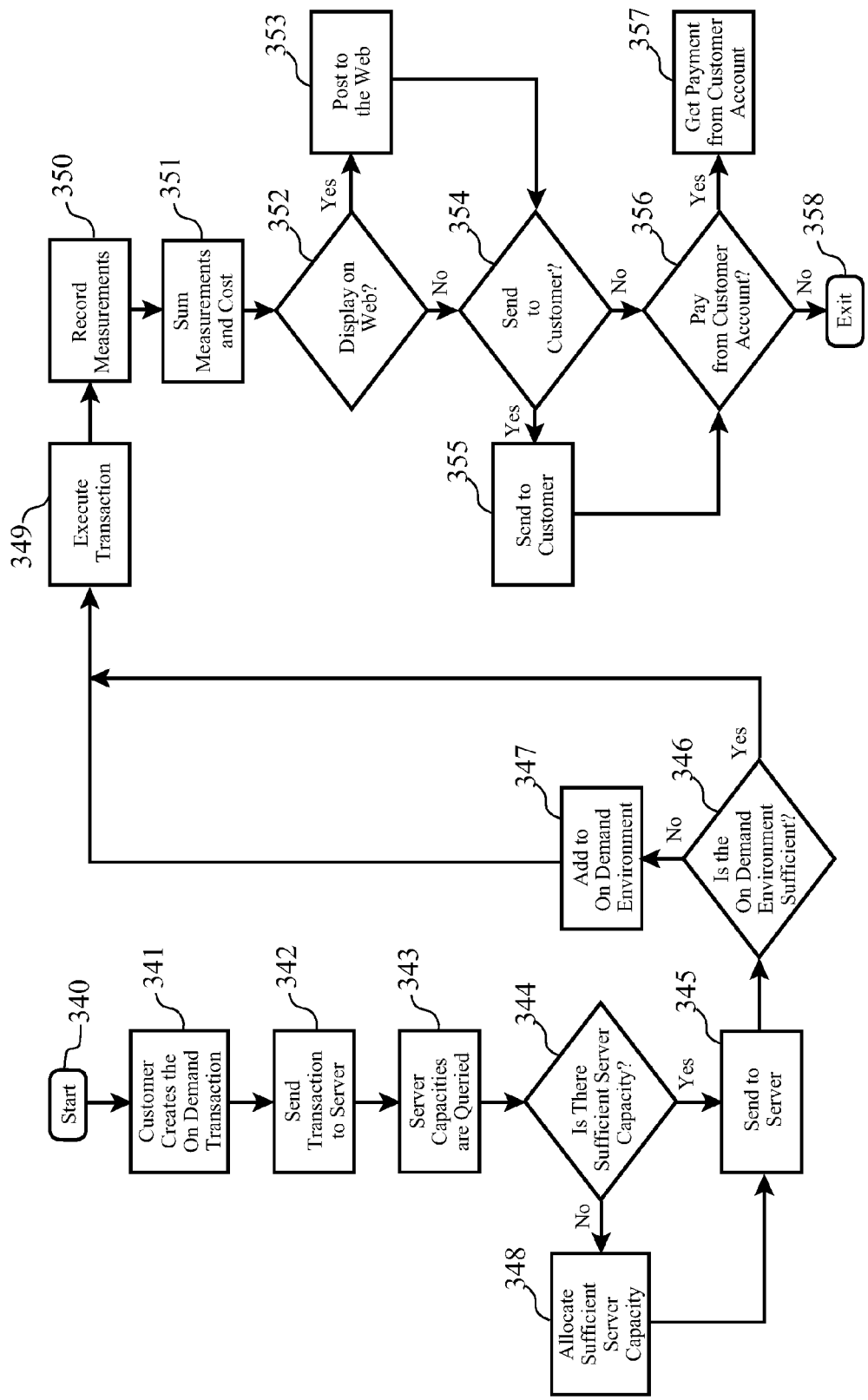
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment

According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment

According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
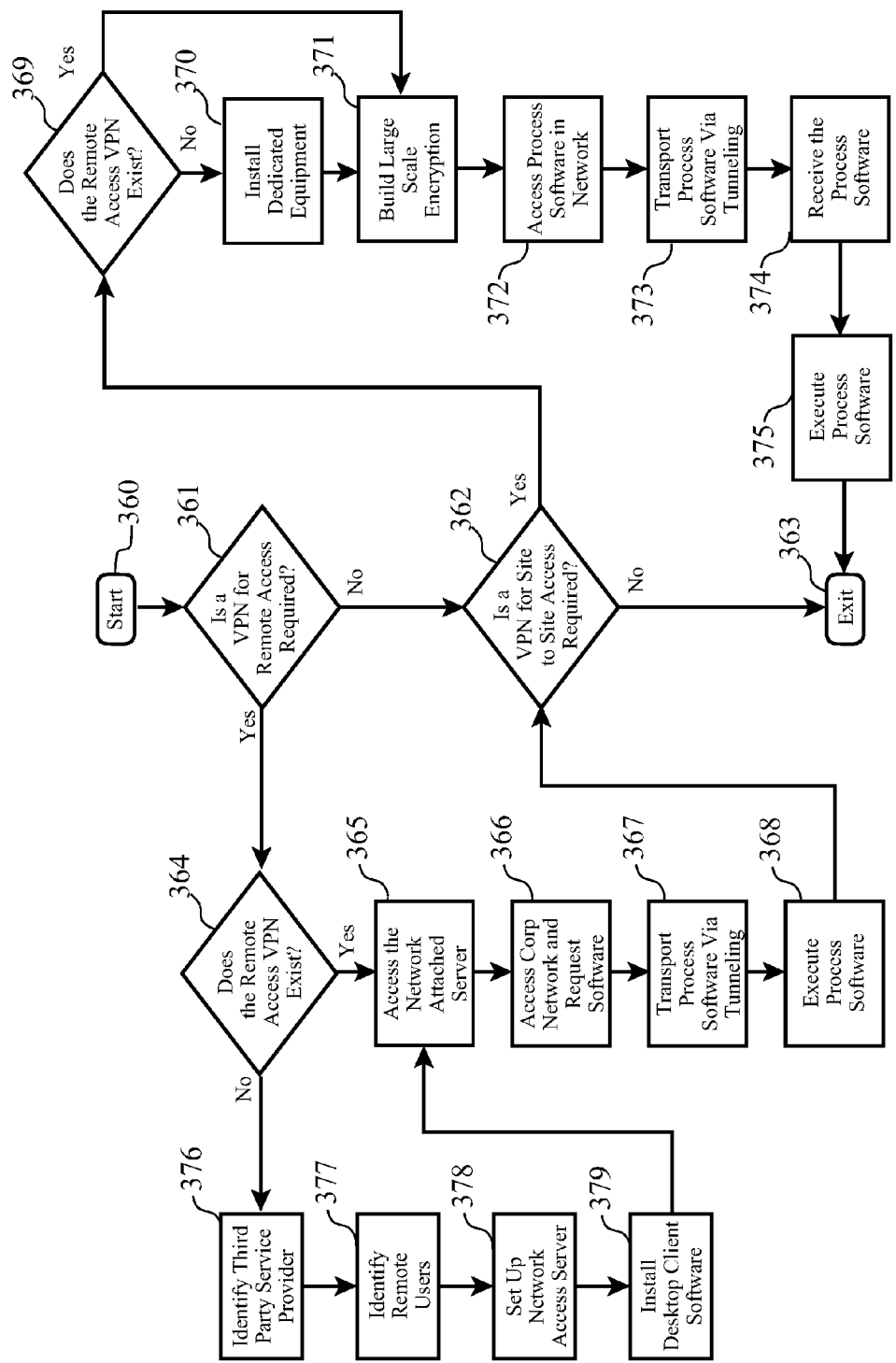
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
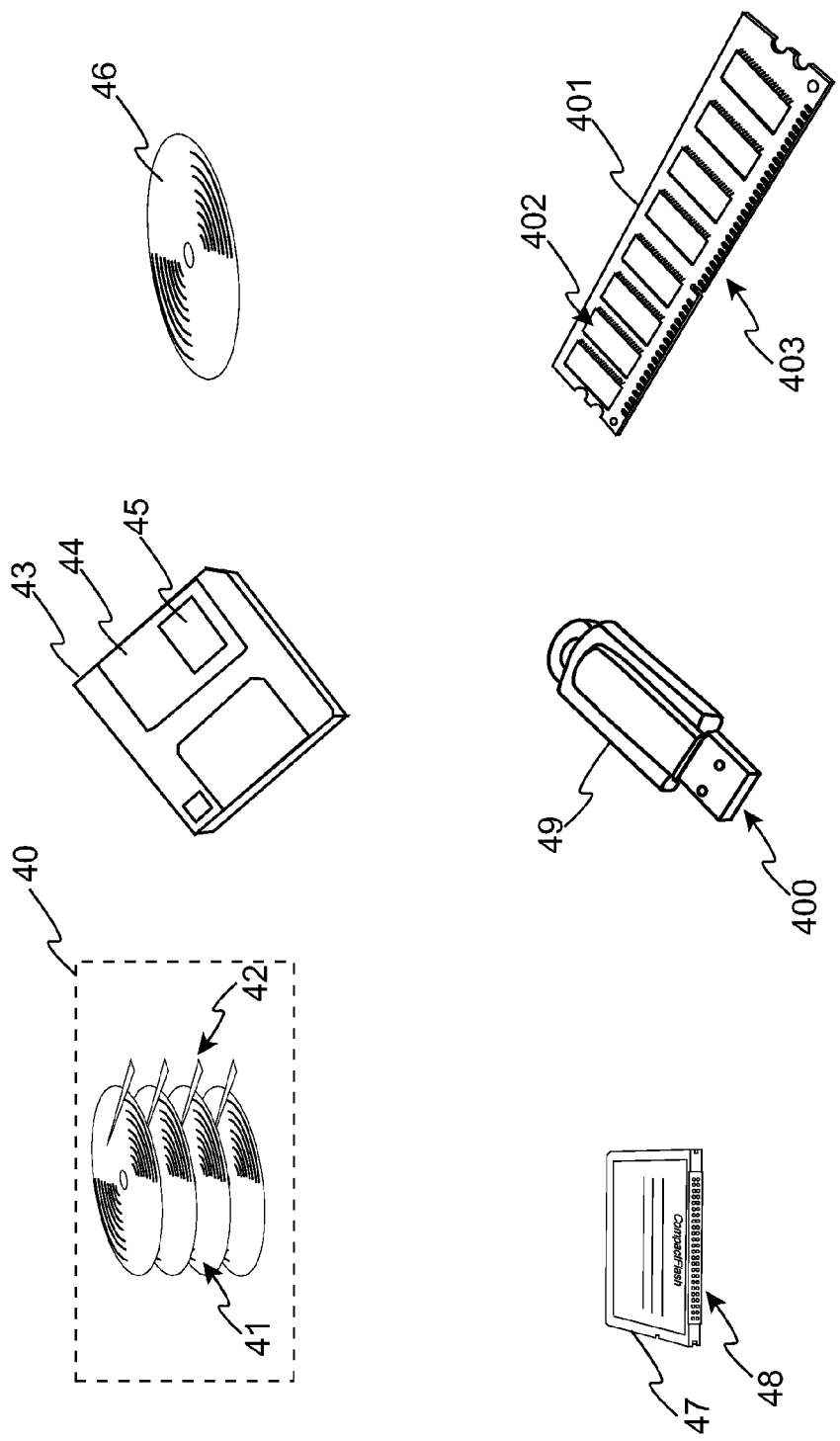
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF")(47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
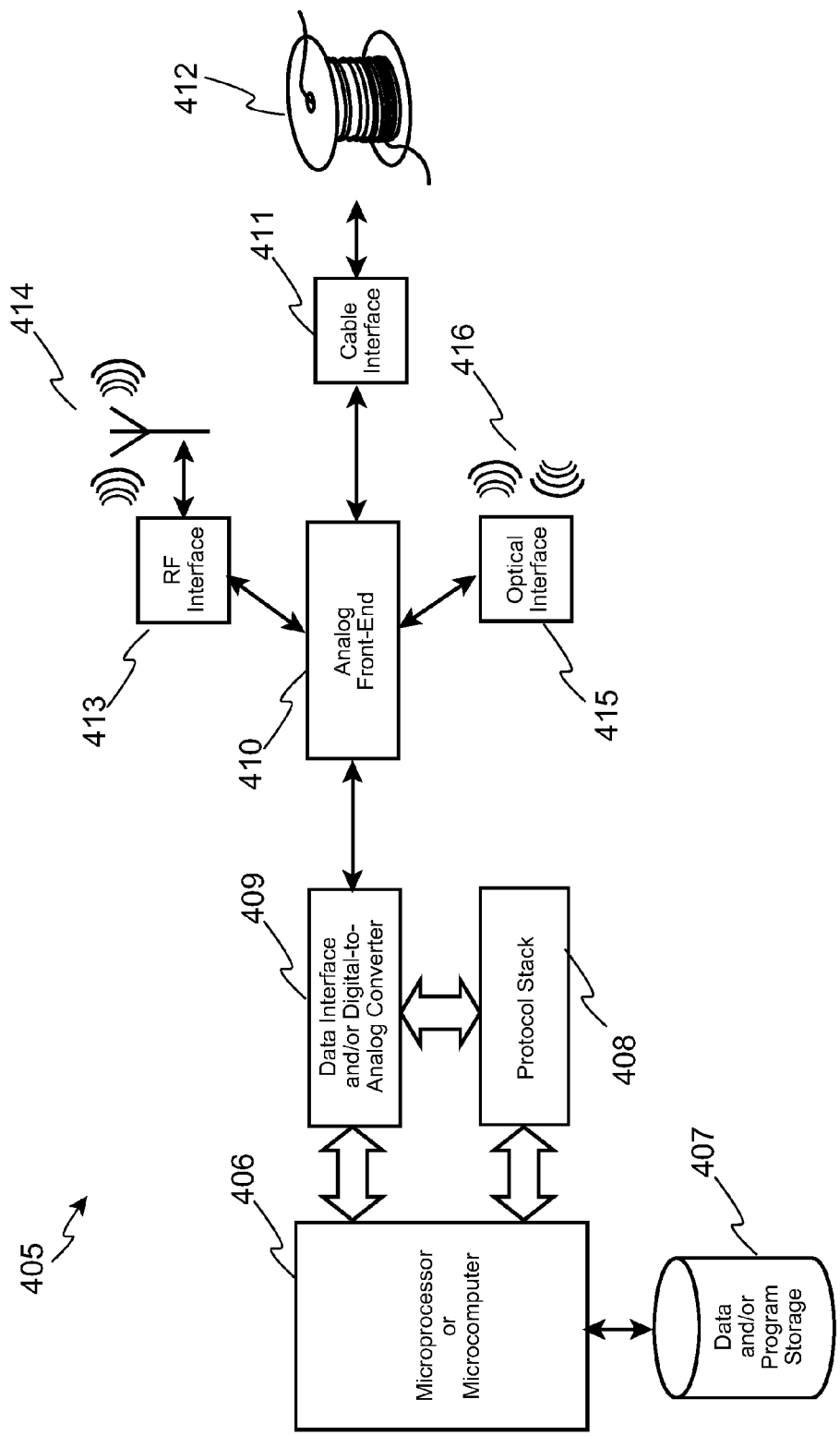

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB Flash-Drive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
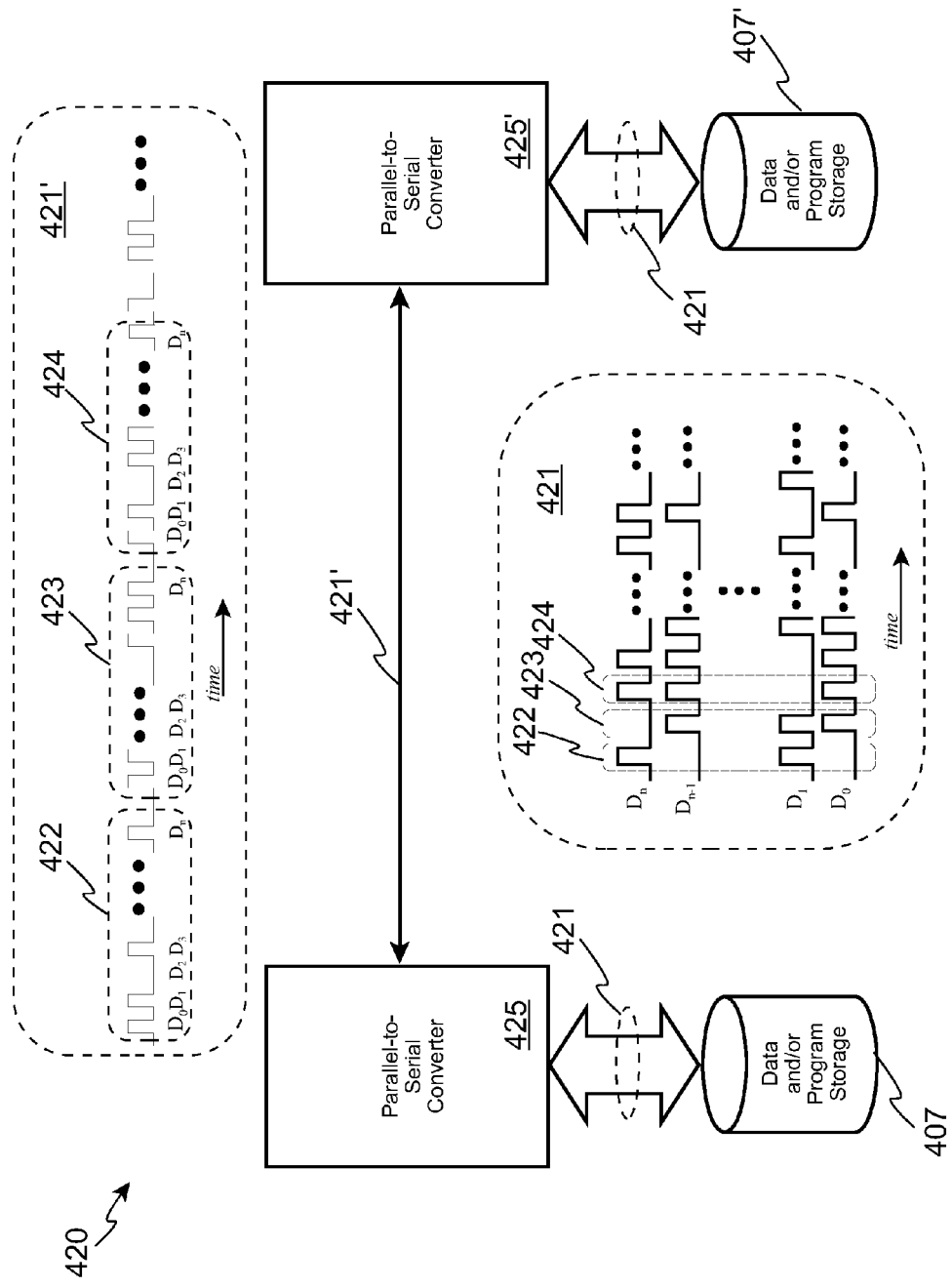

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n-1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A computer system for preventing backdoor vulnerability while handling network access requests, the computer system comprising:
   one or more processors, one or more computer-readable memories, one or more computer-readable storage devices, and program instructions, stored on the one or more storage devices and when executed by the one or more processors,
   responsive to detecting an incoming firewall trusted request from a first client device at a specified communications port, establishing a trusted network communication through a local firewall and a remote firewall by:
      transmitting a firewall identification handshake response to the remote firewall upon receipt of a handshake identification request from the remote firewall;
      transmitting a local firewall public encryption key to the remote firewall responsive to receipt of a remote firewall public encryption key;
      responsive to receiving a signed trusted computer request from the remote firewall and responsive to checking a local public key store to determine that the remote firewall has not previously requested a trusted access, verifying that the trusted computer request is signed using the received remote firewall public encryption key; and
      modifying local firewall rules to allow data communications to and from one or more addresses associated with the remote firewall to be transmitted and received, respectively, with the first client device through the local firewall responsive to determining that the first client device has been previously authorized to establish trusted access with the remote firewall;
      wherein the handshake identification request and the firewall identification handshake response indicate a supported protocol version and an acceptable key algorithm, and wherein the trusted computer request comprises one or more identifiers selected from the group consisting of a name of a computer protected by the local firewall, a username of a user associated with a computer protected by the local firewall, and an electronic mail address of a user associated with a computer protected by the local firewall;

determining that network communications on the specified communications port comprise a wireless communication; and applying a first security policy to establish the trusted network communication responsive to determining the network communications on the specified port comprises a wireless communication, and applying a second, different security policy to establish the trusted network communication responsive to determining the network communication on the specified port comprises a wired communication;

thereby allowing the first client device to use the local firewall as a wireless bridge according to the first security policy, and as a wired bridge according to the second security policy, wherein the first security policy and the second security policy include encryption.

2. The system as set forth in claim 1 wherein the first security policy and the second security policy policies are selected from the group consisting of controlling access to a virtual private network, controlling access to one or more internet protocol addresses, controlling access to one or more internet protocol ports, and shutting down one or more established connections which are using connections having security measures below an acceptable security threshold.

3. The system as set forth in claim 1 wherein the program instructions further comprise program instructions for performing as a proxy server.

4. A method for handling network access requests comprising: responsive to detecting an incoming firewall trusted request from a first client device at a specified communications port, establishing by a processor a trusted network connection through a local firewall and a remote firewall by:

transmitting a firewall identification handshake response to the remote firewall upon receipt of a handshake identification request from the remote firewall;

transmitting a local firewall public encryption key to the remote firewall responsive to receipt of a remote firewall public encryption key;

verifying that the trusted computer request is signed using the received remote firewall public encryption key responsive to receiving a signed trusted computer request from the remote firewall and responsive to checking a local public key store to determine that the remote firewall has not previously requested a trusted access; and modifying local firewall rules to allow data communications to and from one or more addresses associated with the remote firewall to be transmitted and received, respectively, with the first client device through the local firewall responsive to determining that the first client device has been previously authorized to establish trusted access with the remote firewall;

wherein the handshake identification request and the firewall identification handshake response indicate a supported protocol version and an acceptable key algorithm, and wherein identification information in the generation of a trusted computer request comprises one or more identifiers selected from the group consisting of a name of a computer protected by the local firewall, a username of a user associated with a computer protected by the local firewall, and an electronic mail address of a user associated with a computer protected by the local firewall;

determining by a processor that the network communication on the specified communications port comprises a wireless communication; and applying by a processor a first security policy to the trusted network communication responsive to determining the network communication on the specified port comprises a wireless communication, and applying a second, different security policy to the established trusted network communication responsive to determining the network communication on the specified port comprises a wired communication;

thereby allowing the first client device to use the local firewall as a wireless bridge according to the first security policy, and as a wired bridge according to the second security policy, wherein the first security policy and the second security policy include encryption.

5. The method as set forth in claim 4 wherein the first security policy and the second security policy are selected from the group consisting of controlling access to a virtual private network, controlling access to one or more internet protocol addresses, controlling access to one or more internet protocol ports, and shutting down one or more established connections which are using connections having security measures below an acceptable security threshold.

6. The method as set forth in claim 4 further comprising performing operations of a proxy server.

7. A computer program product for handling network access requests comprising:

one or more computer-readable storage devices;

program instructions stored by the computer-readable storage device to establish a trusted network connection through a local firewall and a remote firewall in response to a trusted computer request from a first client device at a specified communication port by:

transmitting a firewall identification handshake response to the remote firewall upon receipt of a handshake identification request from the remote firewall;

transmitting a local firewall public encryption key to the remote firewall responsive to receipt of a remote firewall public encryption key;

verifying that the trusted computer request is signed using the received remote firewall public encryption key responsive to receiving a signed trusted computer request from the remote firewall and responsive to checking a local public key store to determine that the remote firewall has not previously requested a trusted access; and modifying local firewall rules to allow data communications to and from one or more addresses associated with the remote firewall to be transmitted and received, respectively, with the first client device through the local firewall responsive to determining that the first client device has been previously authorized to establish trusted access with the remote firewall;

wherein the handshake identification request and the firewall handshake identification response indicate a supported protocol version and an acceptable key algorithm, and wherein identification information in the generation of a trusted computer request comprises one or more identifiers selected from the group consisting of a name of a computer protected by the local firewall, a username of a user associated with a computer protected by the local firewall, and an electronic mail address of a user associated with a computer protected by the local firewall;

determining that the network communication on the specified communication port comprises a wireless network; and applying a first security policy to the established trusted network communication responsive to determining the network communication on the specified port comprises a wireless communication, and applying a second, different security policy to the established trusted network communication responsive to determining the network communication on the specified port comprises a wired communication;

thereby allowing the first client device to use the local firewall as a wireless bridge according to the first security policy, and as a wired bridge according to the second security policy, wherein the first security policy and the second security policy include encryption.

* * * * *